US009696024B2

(12) United States Patent
Hoffmann et al.

(10) Patent No.: US 9,696,024 B2
(45) Date of Patent: Jul. 4, 2017

(54) HEADLIGHT COMPRISING LIGHT-EMITTING DIODES

(75) Inventors: Helge Hoffmann, Voehringen (DE); Hans-Ulrich Tobuschat, Blaustein (DE)

(73) Assignee: JB-Lighting Lichtanlagentechnik GmbH, Blaustein (DE)

( * ) Notice: Subject to any disclaimer, the term of this patent is extended or adjusted under 35 U.S.C. 154(b) by 637 days.

(21) Appl. No.: 14/009,878

(22) PCT Filed: Apr. 3, 2012

(86) PCT No.: PCT/EP2012/056033
§ 371 (c)(1),
(2), (4) Date: Nov. 12, 2013

(87) PCT Pub. No.: WO2012/136637
PCT Pub. Date: Oct. 11, 2012

(65) Prior Publication Data

US 2014/0063795 A1 Mar. 6, 2014

(30) Foreign Application Priority Data

Apr. 5, 2011 (DE) ........................ 10 2011 001 803
Sep. 12, 2011 (DE) ........................ 10 2011 053 493

(51) Int. Cl.
*B60Q 1/06* (2006.01)
*F21V 29/00* (2015.01)
(Continued)

(52) U.S. Cl.
CPC .............. *F21V 29/60* (2015.01); *F21V 29/02* (2013.01); *F21V 29/673* (2015.01); *F21V 29/83* (2015.01);
(Continued)

(58) Field of Classification Search
CPC ........ F21V 29/83; F21V 29/60; F21V 29/025; F21V 29/673; F21V 29/02; F21V 29/71; F21V 29/85
See application file for complete search history.

(56) References Cited

U.S. PATENT DOCUMENTS 7,290,913 B2 11/2007 Watanabe et al.
9,163,820 B2 * 10/2015 Bakk ..................... F21V 29/004
(Continued)

FOREIGN PATENT DOCUMENTS

DE 10 2007 043 961 A1 3/2009
EP 1 630 474 A2 3/2006
(Continued)

OTHER PUBLICATIONS

International Search Report of PCT/EP2012/056033, dated Jul. 31, 2012.
(Continued)

*Primary Examiner* — Peggy Neils
*Assistant Examiner* — William N Harris
(74) *Attorney, Agent, or Firm* — Collard & Roe, P.C.

(57) ABSTRACT

For a headlight comprising a plurality of light-emitting diode arrangements (LG) arranged in a manner distributed in planar fashion on a carrier plate (TP), a cooling device for dissipating thermal power losses arising in the individual light-emitting diode arrangements, in which cooling device a plurality of flow channels extending parallel in terms of flow engineering are provided. The individual flow channels each contain a heat sink (KK), around which flows the partial air flow through the flow channel (FR) for the transfer of heat and which is connected to the relevant assigned light-emitting diode arrangement in a manner exhibiting good thermal conductivity.

13 Claims, 4 Drawing Sheets

Figure 1:
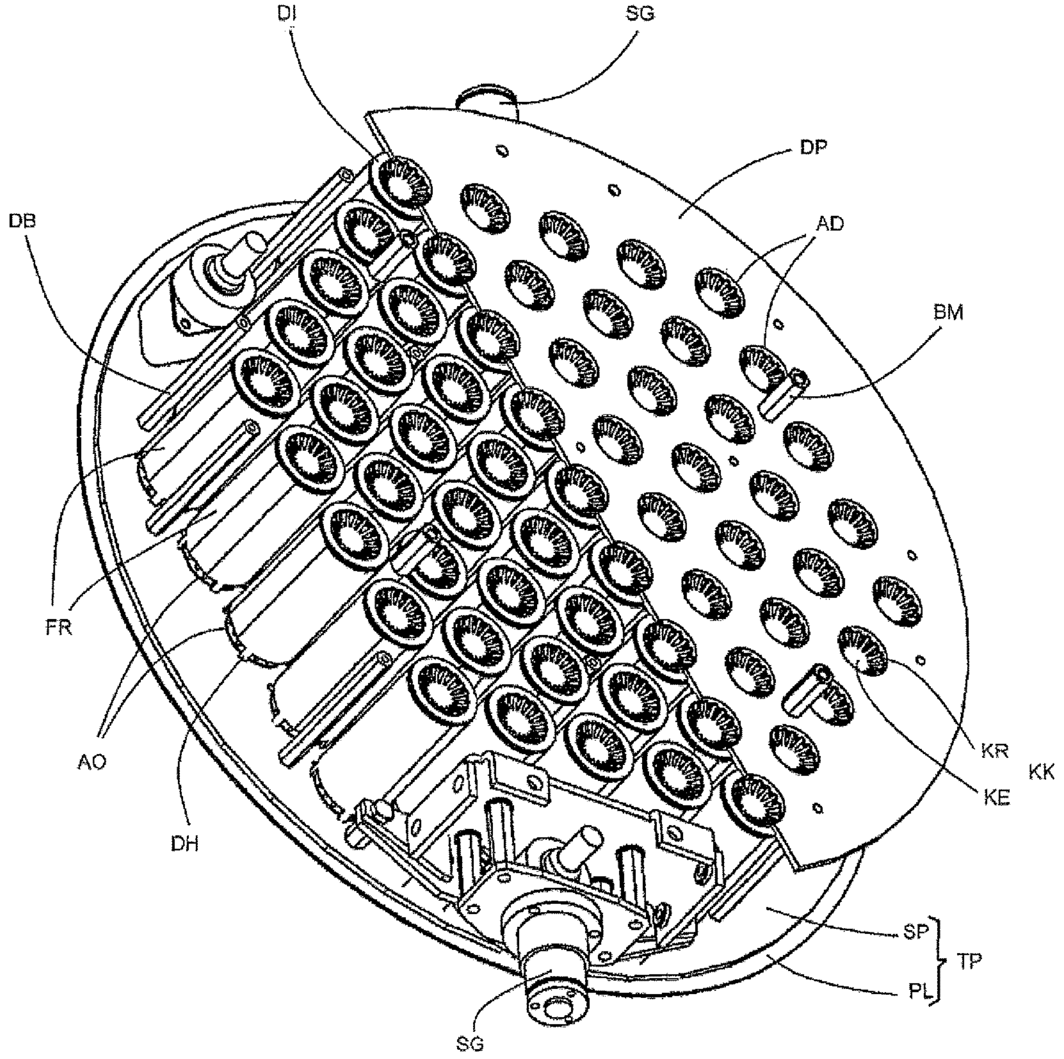

(51) Int. Cl.
*F21V 29/60* (2015.01)
*F21V 29/02* (2006.01)
*F21V 29/67* (2015.01)
*F21V 29/77* (2015.01)
*F21V 29/80* (2015.01)
*F21V 29/83* (2015.01)
*F21Y 115/10* (2016.01)

(52) U.S. Cl.
CPC ............. *F21V 29/773* (2015.01); *F21V 29/80* (2015.01); *F21Y 2115/10* (2016.08)

(56) References Cited

U.S. PATENT DOCUMENTS

2002/0122309 A1* 9/2002 Abdelhafez ............... B64F 1/20 362/294
2006/0082271 A1 4/2006 Lee et al.
2007/0279862 A1* 12/2007 Li ......................... F21V 29/004 361/692
2010/0282446 A1* 11/2010 Yamamoto ................ F21S 8/02 165/109.1
2012/0098401 A1* 4/2012 Yu ......................... F21V 29/004 313/46

FOREIGN PATENT DOCUMENTS

EP 1 647 766 A2 4/2006
WO WO 2005/116522 A1 12/2005

OTHER PUBLICATIONS

English translation of the International Preliminary Report on Patentability and Written Opinion of the International Searching Authority dated Oct. 8, 2013.

* cited by examiner

HEADLIGHT COMPRISING LIGHT-EMITTING DIODES

CROSS REFERENCE TO RELATED APPLICATIONS

This application is the National Stage of PCT/EP2012/056033 filed on Apr. 3, 2012, which claims priority under 35 U.S.C. §119 of German Application No. 10 2011 001 803.4 filed on Apr. 5, 2011, and German Application No. 10 2011 053 493.8 filed on Sep. 12, 2011, the disclosures of which are incorporated by reference. The international application under PCT article 21(2) was not published in English.

The invention relates to a floodlight with light-emitting diodes as light sources.

Floodlights, for example for stage lighting, especially so-called wash lights or projectors, are also used with light-emitting diodes as light sources. The light-emitting diodes may be present both individually and in compact small groups of, for example, three or four light-emitting diodes with preferably several different emission colors. In both the light yield and the useful life, the light-emitting diodes are sensitive to high temperatures of the semiconductor material, so that the effective removal of the loss heat produced in the light-emitting diodes is of special importance.

Common floodlights of this type with a large number of light-emitting diode arrangements possess, for example behind a circuit board common to all light-emitting diodes, a common carrier plate of highly thermally conducting material, especially aluminum, from which cooling fins facing away from the circuit board project. The cooling fins typically run from the middle of the carrier plate substantially radially outward and thus form approximately radial flow channels for cooling air, which is axially blown against the carrier plate at the middle of the carrier plate by means of a fan and is deflected radially and emerges at the lateral periphery of the floodlight. The light-emitting diode arrangements are disposed in highly thermally conducting connection with the common carrier plate.

It is obvious that the removal of loss heat in this way is not satisfactory and leads to irregular failure of light-emitting diodes in the lighting panel.

The present invention is based on the task of specifying a floodlight with improved heat removal from the light-emitting diodes.

The invention is described in the independent claim. The dependent claims contain advantageous configurations and improvements of the invention.

By the several cooling bodies spaced apart from one another and the flow channels, associated with the individual cooling bodies, which are connected in parallel with one another and supply the cooling bodies, in each instance, with their own partial fluid streams, all light-emitting diode arrangements are uniformly cooled. It is evident that hereby the various light-emitting diode arrangements achieve a longer operating lifetime on the average and in particular that premature failures of light-emitting diodes occur less frequently. The more uniform cooling of all light-emitting diode arrangements advantageously enables cooling with ambient air at low flow rates, whereby the critical noise production due to the air stream in many service environments can be kept low. By the uniform cooling of all light-emitting diode arrangements, the light-emitting diode arrangements can be operated with higher average power.

As parallel connection of flow channels, it will be understood by analogy with electrical engineering that the partial fluid streams through the flow channels, in each instance, pass through only one flow channel and not through a further flow channel. The several flow channels may be brought together on the inlet side and/or outlet side relative to the flow directions, especially in a first and/or second common flow space.

The individual flow channels are advantageously closed on all sides across their flow direction and in a preferred embodiment may surround the cooling bodies as tubular bodies. The flow directions in the several flow channels preferably run substantially parallel to one another and preferably at least approximately perpendicular to the surface of the common carrier plate. In cross section, the cooling bodies advantageously contain a central core perpendicular to the flow direction and cooling vanes projecting radially in star-shaped manner from this. In another advantageous embodiment, the cooling bodies have, from a common base body out, several separate cooling fingers with substantially parallel orientation away from the light-emitting diode arrangements.

The invention is based on the knowledge that, because the flow through the cooling fins of common generic floodlights is substantially radial, the heat removal in the radially outwardly lying zones is smaller due to the already preheated air stream than in the middle of the carrier plate, against which cold air flows, and therefore the light-emitting diodes disposed radially outward in the lighting panel attain unfavorable higher operating temperatures because of less heat removal and exhibit a higher failure rate. The invention avoids this by the uniform cooling of all light-emitting diode arrangements over the several parallel flow channels.

The individual flow channels are advantageously constructed to be thermally insulated from one another and from their radially external environment, for which the walls of the flow channels preferably consist at least predominantly of a nonmetallic material, especially a polymer plastic. In particular, with construction of the flow channels inside tubular sleeves and their arrangement in a common flow space externally surrounding the sleeves, it is thereby prevented that a cooling-air flow passing through the common flow space develops heat exchange with the flow channels to noteworthy extent through the channel walls.

Advantageously the cooling bodies are connected through the carrier plate in highly thermally conducting manner with the associated light-emitting diode arrangements, in each instance. In a first advantageous embodiment, the connection is a purely mechanically detachable connection, wherein in particular the light-emitting diode arrangements are pressed against one another at oppositely disposed thermal contact surfaces, in which case a deformable thermally conducting layer, especially a thermally conducting film, is advantageously inserted between the thermal contact surfaces. In this way the light-emitting diode arrangements each advantageously may contain a thermally conducting body of its own, which forms the thermal contact surface with the cooling body and may consist of highly thermally conducting material, especially copper, and on which the light-emitting diodes advantageously may be soldered, if necessary via a support substrate. The thermally conducting bodies advantageously, as heat buffers, may absorb loss heat rapidly from load peaks of associated light-emitting diodes.

Advantageously, holding elements are provided that act directly between the cooling bodies and the light-emitting diode arrangements. In particular, it is possible to provide on the cooling bodies holding elements that project beyond the front side of the carrier plate facing away from the cooling bodies and from the front side can be brought into holding engagement with the light-emitting diode arrangements or detached from them.

In a preferred embodiment, the light-emitting diode arrangements are fastened directly on the cooling bodies, so that particularly good thermal contact is assured. For this the cooling bodies project with extensions through openings of the carrier plate and beyond the front side of the carrier plate.

The cooling bodies advantageously may have a base plate, which in each instance covers one opening of the carrier plate and preferably lies at least in part in the opening of the base plate.

In a preferred embodiment, the cooling bodies are mechanically fixed between carrier plate and cover plate in the direction of their surface normals, for which a bracing of the individual cooling bodies against carrier plate and cover plate may also be provided. A fixation or bracing advantageously takes place via an intermediate body between cooling body and cover plate, in which case such an intermediate body in a preferred embodiment may in tubular configuration simultaneously form an individual flow channel around the associated cooling body.

Figure 2:
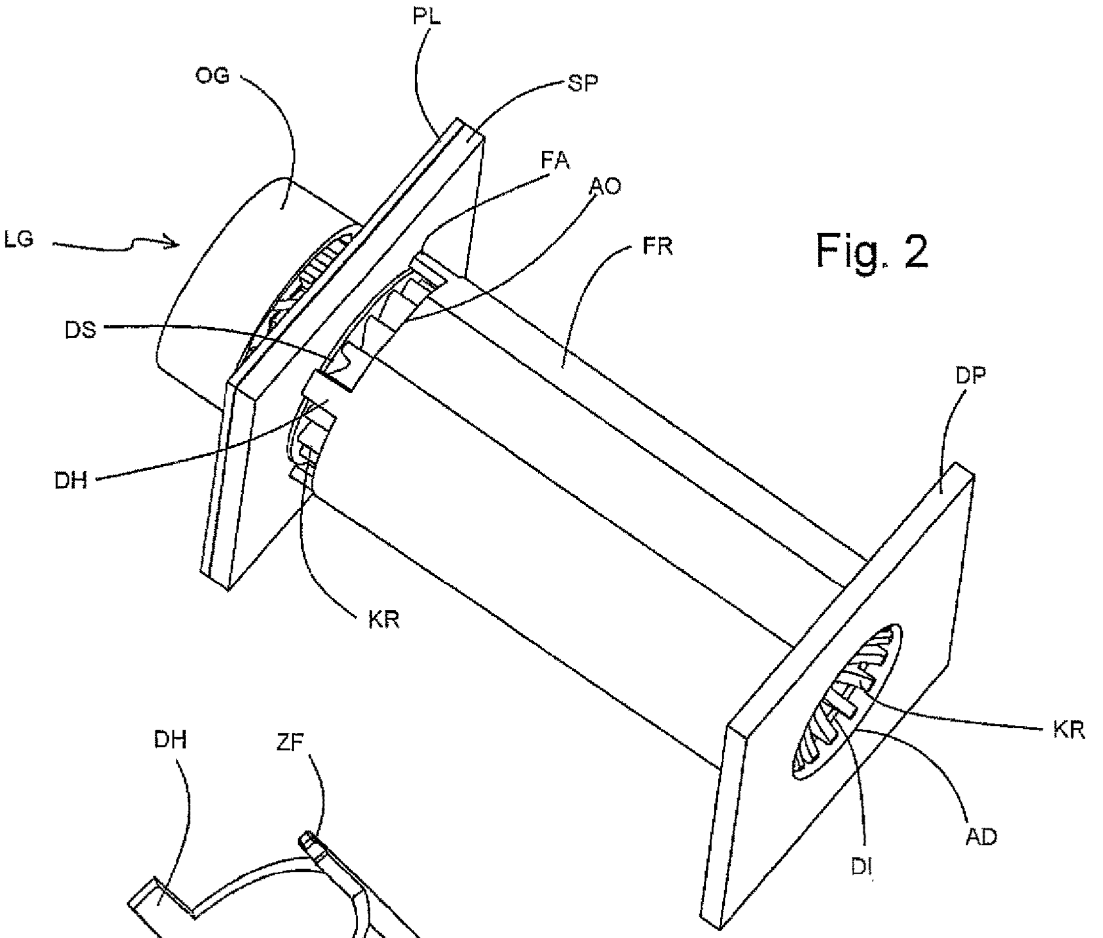
Figure 3:
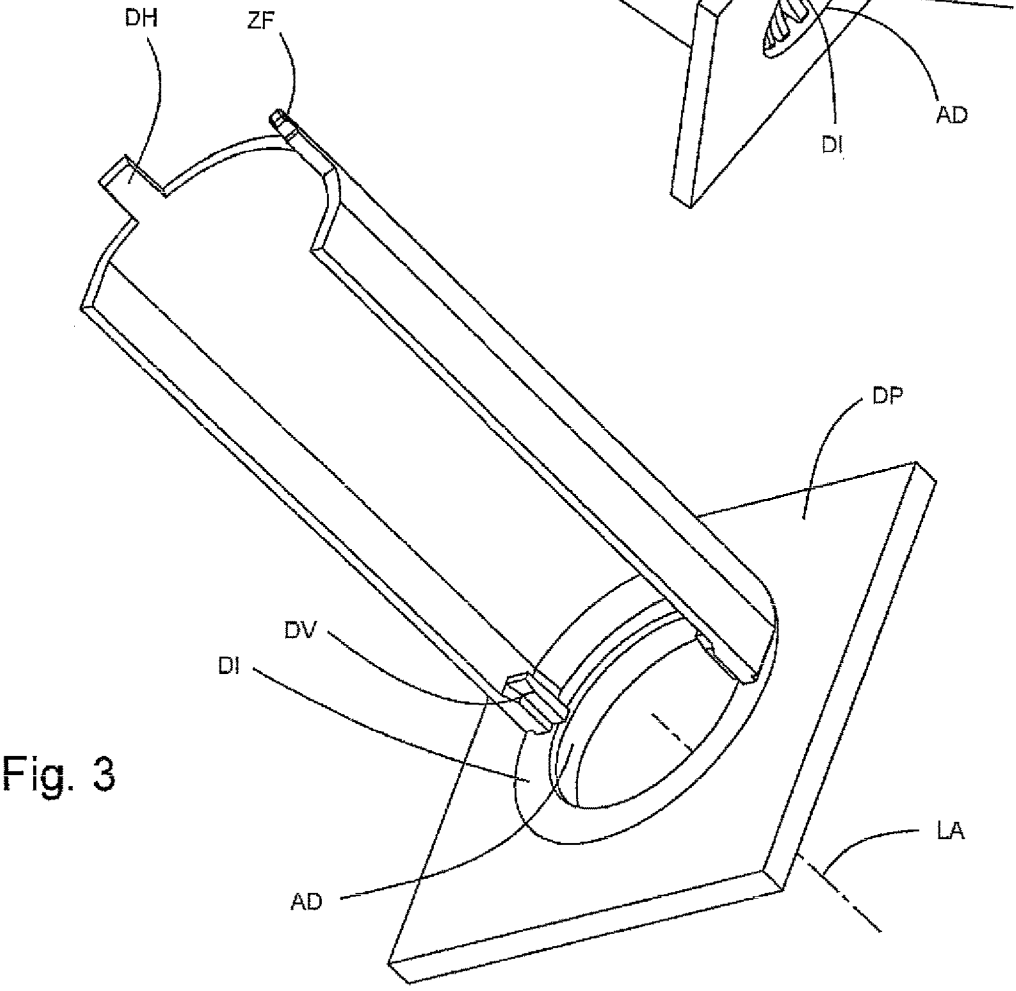
Figure 4:
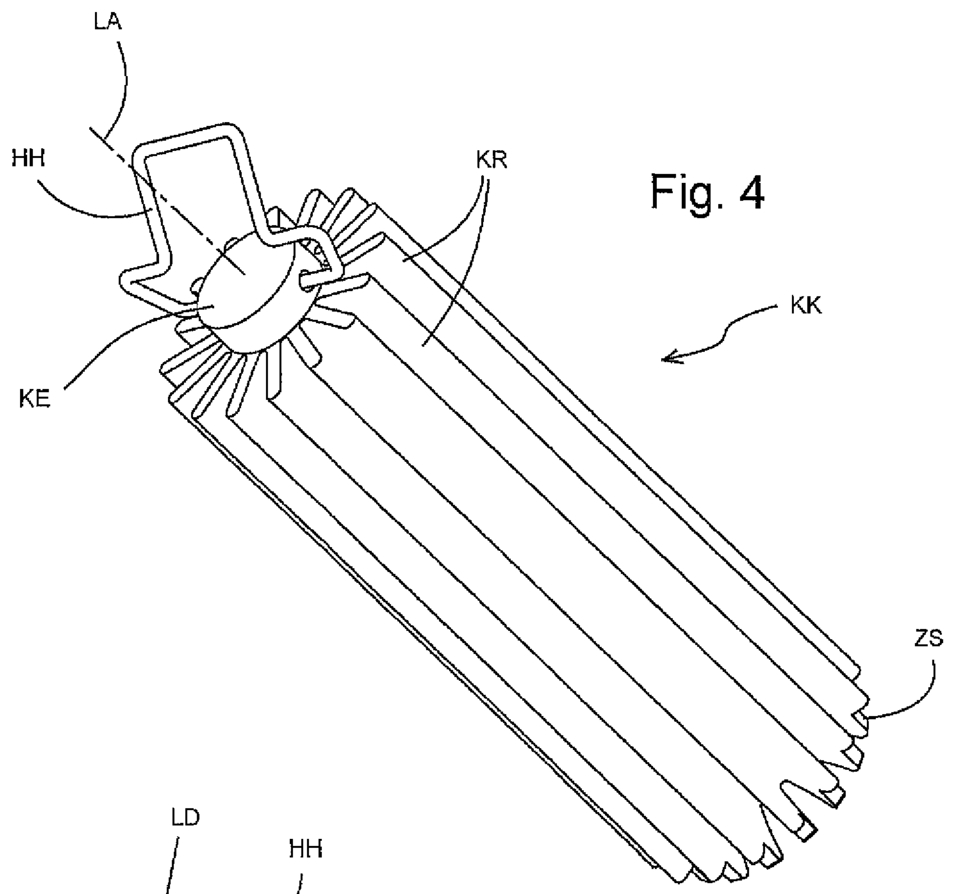
Figure 5:
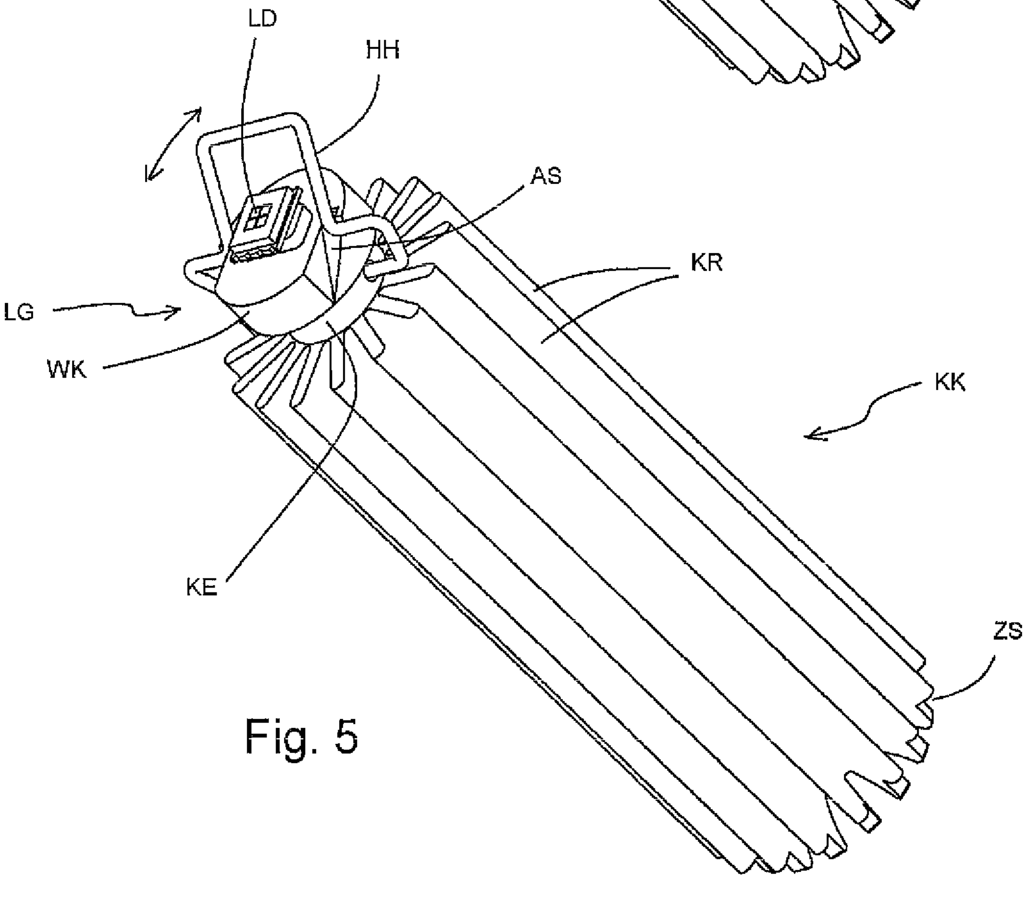
Figure 6:
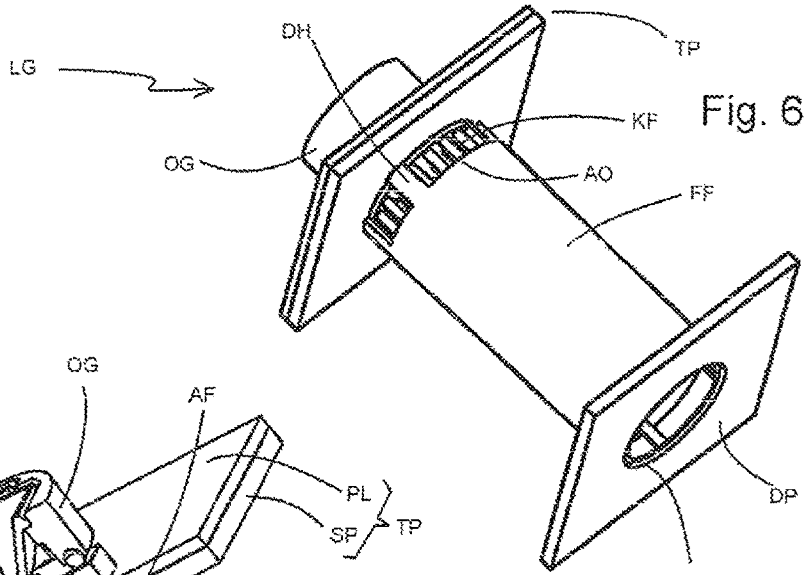
Figure 7:
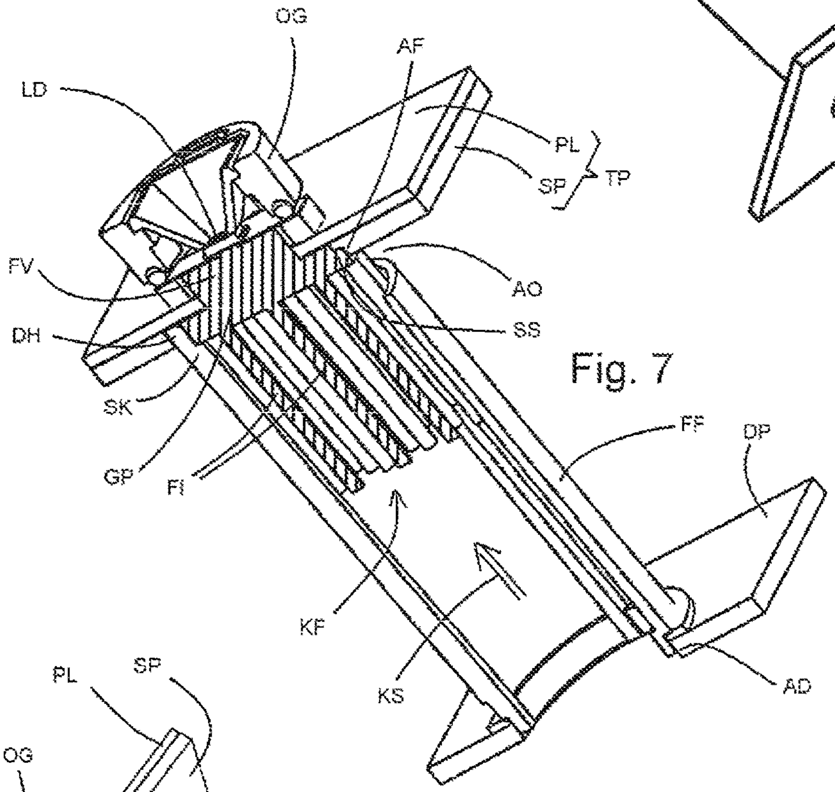
Figure 8:
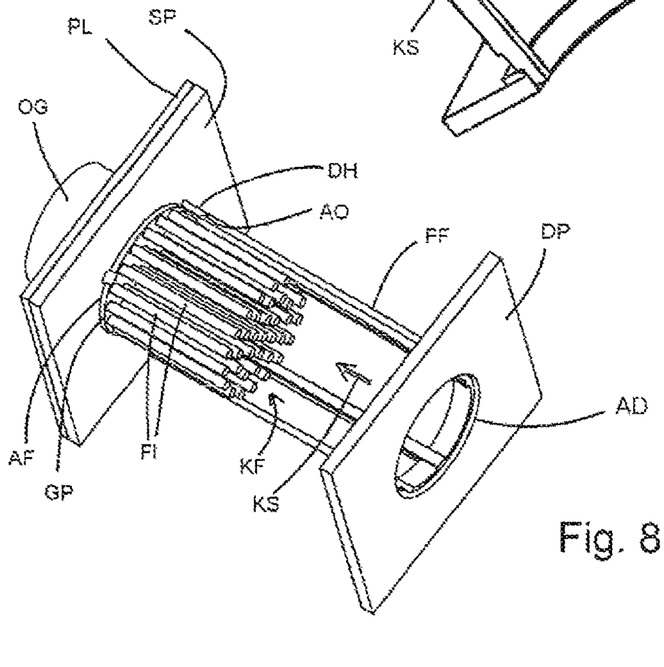

The invention is illustrated in more detail hereinafter on the basis of preferred exemplary embodiments with reference to the illustrations. Therein there are shown in:

FIG. 1 an oblique view of a cooling device of a floodlight,

FIG. 2 a flow channel with cooling body,

FIG. 3 a cut-away flow channel,

FIG. 4 a cooling body,

FIG. 5 a cooling body with light-emitting diode arrangement,

FIG. 6 a non-cutaway view of a preferred embodiment,

FIG. 7 a cutaway representation of FIG. 6,

FIG. 8 another partial cutaway view of FIG. 6.

FIG. 1 shows, in oblique view from behind, a section of a floodlight according to the invention. The floodlight contains in particular a carrier plate TP, which preferably is constructed in two layers from a bracing plate SP and a circuit board PL. A large number of light-emitting diode arrangements is provided on the side of the carrier plate facing away from the observer in FIG. 1. The light-emitting diode arrangements are arranged spaced apart from one another in a preferably regular grid over the surface of the carrier plate. The side of the carrier plate facing away from the observer in FIG. 1 is also designated as the front side, the visible side as the rear side of the carrier plate. Corresponding to its positional designations, front is to be understood as associated with the front side and rear as associated with the rear side.

According to the representation in FIG. 1, a large number of tubular bodies FR is arranged in a regular grid on the rear side of the bracing plate SP. The tubular bodies FR surround cooling bodies KK, which in particular possess a central core KE and cooling vanes KR projecting radially from it, as is illustrated in more detail in figures hereinafter. A cover plate DP, which in FIG. 1 is illustrated in semi-cutaway manner, is provided spaced rearward from the bracing plate SP. Holes AD, in which ends of the cooling bodies KK facing away from the bracing plate SP are inserted centrally, are provided in the cover plate DP in the same surface distribution as the tubular bodies FR. Seals DI advantageously may be inserted between the ends of the tubular bodies FR facing away from the bracing plate SP and the cover plate DP.

FIG. 2 shows in enlarged representation a section from a floodlight of the type illustrated in FIG. 1, wherein only a single tubular body FR with carrier plate, cover plate and cooling body is illustrated in FIG. 2. On the side facing away from the tubular body FR, a light-emitting diode arrangement LG, a housing part OG of which in particular is visible in FIG. 2, is additionally illustrated.

At its end facing toward the bracing plate SP, the tubular body FR has outlet openings AO, which in the sketched example are formed between spacers DH spaced apart in circumferential direction at the end of the tubular body FR.

FIG. 3 shows an assembly of a tubular body FR, centrally cut-away, with a seal and a section of the cover plate DP. The spacers DH advantageously may have at least partial extensions ZF, which engage in holes FA of the bracing plate SP and in this way determine the position of the tubular body FR relative to the bracing plate SP.

Advantageously, each light-emitting diode arrangement arranged on the front side of the carrier plate is allocated a cooling body of its own with tubular body FR, wherein a light-emitting diode arrangement may also contain several individual light-emitting diodes, especially individual light-emitting diodes of different emission color.

The tubular bodies FR define flow channels, which in each instance are associated with the individual light-emitting diodes, for a cooling fluid preferably formed by ambient air. An air flow forced by a fan advantageously takes place from the side of the cover plate DP facing away from the bracing plate SP through the holes AD of the cover plate into the tubular bodies FR, which form defined flow channels having individual partial air streams associated with each light-emitting diode arrangement.

The space between the bracing plate SP and the cover plate DP forms, for all partial air streams flowing through the individual tubular bodies FR, a common flow space, in which all outlet openings AO of the several tubular bodies FR commonly discharge. The first flow space between the bracing plate SP and the cover plate DP is preferably open laterally to the outside.

On the side of the cover plate DP facing away from the bracing plate SP, a second flow space, common to all flow channels, is advantageously formed, to which ambient air as cooling fluid is supplied by a fan common to all flow channels as fluid transport device. In the second common flow space, the fan produces an overpressure, which causes, via the holes AD that form the inlet openings for the flow channels, air to flow through the flow channels and their outlet openings into the first common flow space and from there back again into the surroundings. In another advantageous embodiment, the flow direction may also be set oppositely, with the openings AO as inlet openings and the holes AD as outlet openings.

The dissipation of heat loss outputs occurring in the light-emitting diode arrangements to the partial air flows takes place substantially exclusively in the flow channels inside the tubular bodies FR, where the partial air streams flow along the cooling vanes KR of the cooling bodies KK and absorb heat from them. The cooling bodies KK themselves are in highly thermally conducting contact with the light-emitting diode arrangements, for which purpose holes for passage of heat-transmitting structures are formed in the bracing plate SP and the circuit board PL. The openings in the bracing plate SP are advantageously provided with a sealing washer DS, which tightly surrounds the solid core KE of the cooling body, in each instance, and covers the opening in the bracing plate SP in the zone of the cooling vanes projecting radially from the core. At the inlet opening into the flow channels formed by the tubular bodies FR, a seal is advantageously provided by an O-ring DI in combination with the end of the tubular body FR facing away from the bracing plate SP and facing toward the cover plate DP, as is visible from FIG. 3.

The cooling bodies are advantageously centered within the tubular bodies FR and in this connection are spaced a small distance apart from the inside wall of the tubular bodies FR by the radially outwardly lying edges of the cooling vanes KR. At the same time, an anti-twist capability advantageously may be formed via the cooling-vane structure by the fact, as sketched in FIG. 3, that locking projections DV on the tubular bodies FR project radially inward and engage, in each instance, in an intermediate space between adjacent cooling vanes. At the same time, the projections DV are able to center the tubular bodies FR relative to the cooling bodies and therefore relative to the holes AD in the cover plate and to the O-rings DE, which advantageously are inserted in recesses of the cover plate DP at the holes AD. The tubular bodies FR are preferably constructed as plastic injection-molded bodies. In another embodiment, the cover plate and the tubular bodies also may be formed by a one-piece plastic injection-molded part.

FIG. 4 shows in isolated representation a cooling body KK, which is constructed in elongated manner in the direction of a longitudinal axis LA and in particular also may be formed by a portion of a profile section, especially an extruded profile section of aluminum.

At the end of the cooling body KK facing toward the cover plate DP, a circular circumferential step ZS, which in assembled state is inserted in the hole AD of the cover plate and centers the cooling body relative to the cover plate, is formed at the ends of the cooling vanes KR. The core of the cooling body is advantageously hollowed out deeply relative to the plane of the ends of the cooling fins.

At the end of the cooling body facing toward the bracing plate, this is radially reduced to a zone of the solid core KE. The core KE may project in particular through a hole AS in the bracing plate SP and an opening formed in the circuit board PL and constitute the thermal contact with the light-emitting diode arrangement on the front side of the carrier plate. By means of a holding element HH, which in the sketched example is constructed as a pivotal lever, a light-emitting diode arrangement can be fixed clampingly on the core zone KE of the cooling body, as illustrated in FIG. 5, and braced against the core zone KE. For this, the light-emitting diode arrangement advantageously contains a thermally conducting body WK of highly thermally conducting material, especially copper, on which a compact group of four light-emitting diodes is fastened, especially soldered, in highly thermally conducting manner. The holding element HH is held pivotally on the core zone KE of the end of the cooling body KK facing toward the bracing plate SP. The sealing washer DS illustrated in FIG. 2 lies between the suspension of the holding element HH at the core zone KE of the cooling body KK and the ends of the cooling vanes KR facing toward the bracing plate SP. For the construction of holding elements, various other structures are known in themselves to the person skilled in the art.

By pivoting the holding element HH in the arrow direction illustrated in FIG. 5, the thermally conducting body WK can be pressed in the direction of the longitudinal axis LA of the cooling body against the end surface of the core zone KE, in order to assure a good heat transfer from the thermally conducting body WK of the light-emitting diode arrangement to the cooling body KK. Advantageously, a highly thermally conducting, deformable layer, especially a thermally conducting film, which is able to conform to small irregularities of the oppositely disposed thermal contact surfaces and thus bring about particularly good heat transfer, may be inserted between the thermal contact surfaces, which are disposed opposite one another and are pressed against one another, of the thermally conducting body WK on the one hand and of the cooling body KK on the other hand.

In another embodiment, not illustrated, a cooling body may contain a base body facing toward the light-emitting diode arrangements and, starting from this, several cooling fingers, which in a manner separate from one another extend from the base body in a direction pointing away from the light-emitting diode arrangement. The base body may be joined to the hot-air body in a manner corresponding to the core KE.

By the separate guidance of partial air streams through the individual tubular bodies FR as flow channels, the individual partial air streams, with which the respective associated light-emitting diode arrangements are cooled via the cooling bodies, are substantially the same for all light-emitting diodes and are thermally decoupled from one another by the parallel flow guidance. Because of the construction of the tubular bodies FR from poorly thermally conducting, especially nonmetallic plastic material, a radial temperature gradient inside the first flow space between bracing plate SP and cover plate DP practically does not influence the partial air streams in the individual parallel flow channels, so that equal thermal conditions may be created for all light-emitting diode arrangements independently of the positioning within the surface of the carrier plate. In a preferred flow direction of the partial air streams through the tubular bodies FR into the first common flow space, the tubular bodies lying radially further outward relative to the surface centers of cover plate and carrier plate are washed around their outside wall surfaces by an air stream already preheated by the cooling bodies arranged at the surface centers. Because of the thermally insulating construction of the tubular body walls from poorly thermally conducting material, a heat input from the preheated air stream into the flow channels lying radially further outward is largely prevented. A corresponding effect is also achieved in opposite flow direction.

Carrier plate TP and cover plate DP may be fixed in given spatial position relative to one another by fastening elements, which in FIG. 1 are denoted by DB and BM. Pivot joint stubs SG, which permit pivoting of the floodlight around the pivot axis of the stubs SG, are also illustrated in FIG. 1.

FIG. 6 shows in a view analogous to FIG. 2 a section from a cooling device of a floodlight with a light-emitting diode arrangement and a cooling body KF largely surrounded by a tubular body FF. By analogy with the exemplary embodiment according to FIG. 2, the tubular body FF again has spacers DH and outlet openings AO at its end facing toward the carrier plate TP. In FIG. 6, parts of a cooling body KF can be recognized through the outlet openings AO. Once again, a housing part OG of a light-emitting diode arrangement LG is illustrated on the side of the carrier plate TP facing away from the cover plate DP. In the example sketched in FIG. 6, the tubular body FF again projects with its end facing away from the carrier plate TP into a hole AD of the cover plate DP and with respect to the longitudinal axis of its tube is held and braced there axially and transversely relative to the longitudinal axis of the tube.

FIG. 7 shows the arrangement according to FIG. 6 as a cutaway representation with a section plane containing the longitudinal axis of the tube of the tubular body FF. The cooling body KF possesses a base plate GP, which is inserted in a hole AF of the bracing plate SP. Advantageously a step SS, which corresponds with a stepped contour of the hole AF in the bracing plate SP and braces the base plate and thus the entire cooling body in axial direction relative to the longitudinal axis of the tube and at the same time fixes it transversely relative to the longitudinal axis of the tube, may be formed on the base plate GP. At its end facing toward the carrier plate, the tubular body FF likewise advantageously has a bracing structure, for example in the form of a step SK on the spacers DH, which is braced on the side of the base plate GP facing away from the carrier plate. The end of the tubular body FF facing away from the carrier plate is braced axially on the cover plate DP, so that an axial bracing and fixation of the cooling body KF between cover plate DP and carrier plate is achieved via the tubular body FF. At the outlet openings AO, as in the example according to FIG. 2, the edge of the tubular body FF facing toward the carrier plate is spaced apart from the carrier plate around the outlet openings AO.

The base plate GP of the cooling body is continued into the tubular body FF in the form of a large number of rod-like cooling fingers FI, which are spaced apart from one another and along which a cooling air stream, the preferred flow direction of which in the tubular body FF is denoted with KS, passes and absorbs heat from the cooling fingers FI and emerges as a heated air stream through the outlet openings AO. In a preferred embodiment, the cooling fingers FI are substantially parallel to one another and to the longitudinal axis of the tube of the tubular body FF.

In the exemplary embodiment illustrated in FIG. 7, the base plate GP of the cooling body is continued through the opening in the bracing plate SP and the circuit board PL with an extension FV. The light-emitting diode module LD is fastened on the end of the extension FV of the cooling body facing away from the cooling fingers FI or the cover plate DP, whereby a particularly small heat-transfer resistance from the light-emitting diodes to the cooling body is achieved. The housing part OG of the light-emitting diode arrangement may contain in particular a reflector flared conically in beam direction. In a manner not further significant for the present invention, the housing part OG may additionally serve for electrical contacting of the light-emitting diode arrangement with conductor tracks or contacts on the circuit board PL and/or for mechanical fixation of the cooling body in the opening of the carrier plate. A mechanical fixation of the cooling body relative to the carrier plate may also be provided by interlocking structures between extension FV of the cooling body on the one hand and the carrier plate on the other hand.

FIG. 8 shows the arrangement according to FIGS. 6 and 7 in a further view, in which the tubular body FF is cut away compared with the illustration according to FIG. 6 and details of the cooling body KF with the cooling fingers FI projecting from the base plate GP are apparent.

The features in the foregoing and those specified in the claims as well as apparent from the illustrations are advantageously realizable both individually and in various combinations. The invention is not restricted to the described exemplary embodiments but may be modified in various ways within the scope of know-how of those skilled in the art.

The invention claimed is:

1. A floodlight comprising a plurality of approximately point-source light-emitting diode arrangements arranged spaced apart from one another on a common carrier plate as well as with a cooling device for each light-emitting diode for removal of loss heat occurring in the light-emitting diode arrangements by means of a fluid flow forced by a fluid-transport device via a cooling body arrangement joined in direct thermally conducting manner with the light-emitting diode arrangement, wherein the cooling body arrangement contains a plurality of discrete cooling bodies spaced apart from one another and a flow-guiding device that supplies the cooling bodies individually with partial fluid streams via flow channels connected in parallel with one another, wherein the flow channels on a facing-away rear side of the carrier plate are oriented transversely relative to the carrier plate, wherein the flow channels are formed by tubular bodies surrounding each of the cooling bodies separately, and wherein the tubular bodies are made of a poorly thermally conducting material.

2. The floodlight according to claim 1, wherein each light-emitting diode arrangement is allocated a cooling body of its own with flow channel.

3. The floodlight according to claim 1, wherein a first flow space disposed in fluid-guiding communication with all flow channels is formed on the rear side of the carrier plate.

4. The floodlight according to claim 3, wherein the first flow space is constructed such that the flow is laterally open to external surroundings of the floodlight.

5. The floodlight according to claim 3, wherein the flow channels at their ends facing toward the carrier plate are open to the first common flow space.

6. The floodlight according to claim 3, wherein the first flow space is closed by a cover plate spaced apart from the rear side of the carrier plate.

7. The floodlight according to claim 6, wherein the flow channels lead through openings of the cover plate.

8. The floodlight according to claim 7, wherein the flow channels on a side of the cover plate facing away from the carrier plate are in communication with a second common flow space.

9. The floodlight according to claim 8, wherein the forced fluid streams through the flow channels are directed from the second to the first common flow space.

10. The floodlight according to claim 9, wherein the fluid transport device is arranged upstream from the second common flow space.

11. The floodlight according to claim 1, wherein the fluid is ambient air.

12. The floodlight according to claim 1, wherein the cooling bodies are in direct thermally conducting contact with the associated light-emitting diode arrangements through openings of a carrier plate.

13. The floodlight according to claim 12, wherein the cooling bodies contain a base plate covering the opening of the carrier plate and a plurality of cooling fingers oriented substantially parallel and separate from one another, directed away from the base plate.

* * * * *